(12) United States Patent
Pugel et al.

(10) Patent No.: US 6,970,068 B1
(45) Date of Patent: Nov. 29, 2005

(54) APPARATUS AND ASSOCIATED METHOD FOR LIMITING ACCESS OF INFORMATION TRANSFERRED BETWEEN AN ELECTRONIC SECURITY DEVICE AND A HOST DEVICE

(75) Inventors: Michael Anthony Pugel, Noblesville, IN (US); David Jay Duffield, Indianapolis, IN (US); Robert James Ramspacher, Fishers, IN (US)

(73) Assignee: Thomson Licensing S.A., Boulogne-Billancourt (FR)

( * ) Notice: Subject to any disclaimer, the term of this patent is extended or adjusted under 35 U.S.C. 154(b) by 368 days.

(21) Appl. No.: 10/031,097

(22) PCT Filed: Jun. 26, 2000

(86) PCT No.: PCT/US00/17441

§ 371 (c)(1),
(2), (4) Date: Jan. 10, 2002

(87) PCT Pub. No.: WO01/06783

PCT Pub. Date: Jan. 25, 2001

Related U.S. Application Data

(60) Provisional application No. 60/143,844, filed on Jul. 15, 1999.

(51) Int. Cl.[7] ............... H04Q 9/00; G06K 5/00; H04N 7/16

(52) U.S. Cl. ............... 340/5.65; 235/380; 725/6

(58) Field of Search ............... 340/5.65; 235/380; 725/6

(56) References Cited

U.S. PATENT DOCUMENTS 5,757,271 A  *  5/1998  Andrews ............... 340/568.1

FOREIGN PATENT DOCUMENTS

| EP | 0565281 | 10/1993 | ............ G11B 20/00 |
|---|---|---|---|
| EP | 0706291 | 4/1996 | ............ H04N 7/16 |
| EP | 0880311 | 11/1998 | ............ H05K 9/00 |
| WO | 96/00951 | 1/1996 | ............ G06K 7/06 |

* cited by examiner

Primary Examiner—Michael Horabik
Assistant Examiner—Scott Au
(74) Attorney, Agent, or Firm—Joseph S. Tripoli; Joseph J. Laks; Paul P. Kiel

(57) ABSTRACT

A device for sensing unauthorized use of an electronic security device has a host device and a detector with a loop antenna associated with the port that receives the electronic security device, such as a smart card. The host device comprises a housing having the port formed therein. In one embodiment, the port detector senses radiation emitted from unauthorized use of the electronic security device by attachment of hot-wire conductors to the security device, which conductors carry currents through the port and the detector. In an alternate embodiment, the dielectric constant of the electronic security device is measured and compared to a predetermined value for distinguishing a nominal device from one with attached hot wiring.

8 Claims, 3 Drawing Sheets

APPARATUS AND ASSOCIATED METHOD FOR LIMITING ACCESS OF INFORMATION TRANSFERRED BETWEEN AN ELECTRONIC SECURITY DEVICE AND A HOST DEVICE

This application claims the benefit under 35 U.S.C. § 365 of International Application PCT/US00//17441, filed Jun. 26, 2000, which was published in accordance with PCT Article 21(2) on Jan. 25, 2001 in English; and which claims benefit of U.S. provisional application Ser. No. 60/143,844 filed Jul. 15, 1999.

BACKGROUND OF THE DISCLOSURE

1. Field of the Invention

The invention relates to electronic security devices. More particularly, the invention relates to techniques limiting access to information transferred between the electronic security device and a host device.

2. Description of the Prior Art

Smart cards, and other similar electronic security devices, are known for their capabilities in storing information pertaining to a variety of applications relating to, e.g., stored funds, personal identification and other personal data, and for their ability to access certain host devices. In this disclosure, the term "smart card" is one type of "electronic security device". International Organization for Standardization Standard 7816 (ISO7816), defines the layout and electrical design of smart cards and the associated electrical contacts. The term "electronic security device" also includes PCMIA cards.

Applications for smart cards include satellite receiver set-top boxes, MMDS and cable boxes, controlling personal access to restricted areas, providing access to bank accounts, phone cards, and a growing variety of other applications. Host devices typically have one particular electronic security card associated therewith. Alternatively, each user may have a separate smart card having selected entitlements or limitations, such that when one user's smart card is removed from a host device (e.g., set top box) and another user's smart card is inserted into the host device, the latter user can start using the same host device with their own personal programming entitlements.

The physical size of the electrical contacts and the associated interconnects, in ISO7816, is relatively small. Therefore, the emitted electromagenetic radiation generated by the electrical contacts is similarly small, and difficult to detect. This limiting the detection of electromagnetic radiation further enhances the security of smart cards.

Hackers attempt to gain unauthorized access to information contained in the electronic security device, or alternatively, tamper with the electronic security device in order to gain services without authorization or payment. In addition to gaining unauthorized access or receive unauthorized services, people may wish to modify information contained in a smart card and/or modify or view information transferred between the smart card and the host device. One technique that aids in this unauthorized access or modification of information is referred to as "hot-wiring" a smart card. This hot-wiring is accomplished by affixing a single distinct wire to each distinct electrical contact in the smart card "contact patch". The smart card is then inserted into the host device and the host device begins to interact with the smart card with wires extending from the port, possibly permitting confidential information outside of the host device. Electronic circuitry can be connected to the wires outside of the port possibly leading to modification of either the information contained in the smart card or the modification of signals transmitted between the smart card and the host device. If a hacker uses suitable equipment outside the host device, the hacker can obtain much of the confidential information that is stored in the smart card, and can also produce a copy of the smart card.

Another technique to modify information contained in smart cards involves so-called paddleboards or smart card emulators. These paddleboards are actual physical portions of printed circuit boards that are approximately the same size as smart cards (although paddleboards are typically somewhat thicker than smartcards), and they contain a smart card "contact patch" with multiple electric contacts that are configured to interact with a host device. Paddleboards contain a computer chip that enables them to interact with host devices in a similar manner as a smart card would interact with host devices.

In this disclosure, hot-wiring, paddleboards, and any other system by which information stored in a smart card is accessed or changed, or information transferred between a smart card and a host device is accessed or modified is referred to in this specification as "modifying" the information or modifying the electronic security device.

Therefore, a need exists in the art for a device to limit smart card modification. This device will improve security associated therewith by preventing unauthorized use of access codes and breach of confidentiality, thereby improving user confidence in the system.

SUMMARY OF THE INVENTION

The present invention is embodied in a port detector for a host device that is capable of accessing the information on the electronic security device. The host device includes a housing having a port formed therein. The port is configured to receive the electronic security device. The port detector of the present invention is located proximate to the port. If the electronic security device has been modified, in one embodiment, the port detector senses radiation emitted from the hot-wired wire as a result of the transfer of the signals from the electronic security device, via the port to outside of the host device. In another embodiment, the dielectric characteristic of the electronic security device is measured and compared to a known value. If the comparison exceeds a predetermined limit then the electronic security device is considered to be a copy. Upon either of these two cases, the port detector may produce a signal used to deactivate the host device or the transfer of information between the host device and the electronic security device, or alternatively may warn an operator about unauthorized access of the host device.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
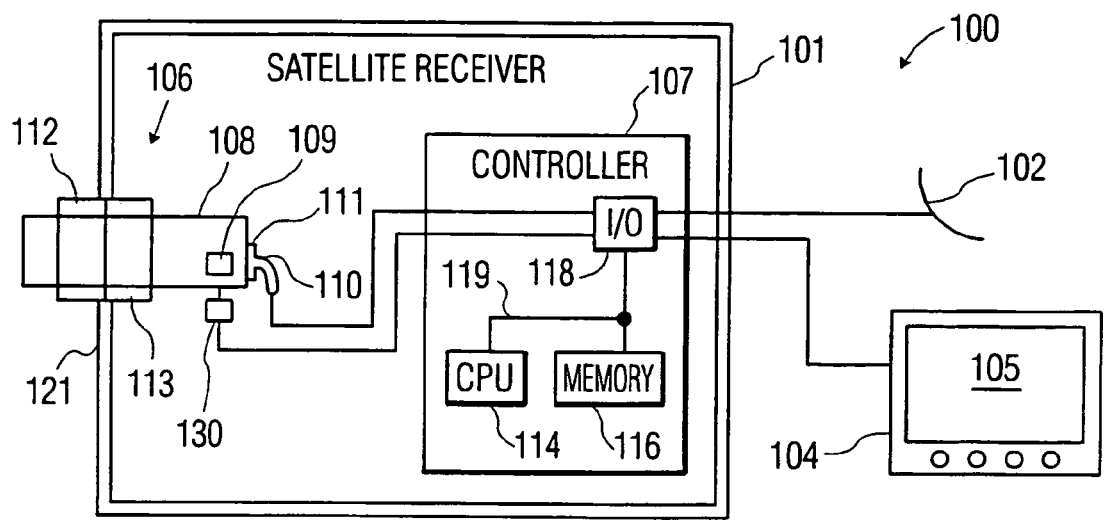
FIG. 1 shows a schematic diagram of one embodiment of the present invention.

FIG. 1 shows one embodiment of the present invention comprising a known receiver system 100 that includes a host device, e.g., satellite receiver 101, a satellite dish 102, and a television 104. The satellite receiver 101 includes any type in common usage today that can interact with, e.g., low earth orbit or geostationary satellites. While host device 101 is depicted in FIG. 1 as a satellite receiver, other host devices that can interact with an ISO 7816 smart card, a PCMIA card, or any other type of electronic security device in which it is desired to prohibit people from modifying information contained therein is within the scope of the present invention. Such alternate embodiments of a host device includes cable network receivers, terrestrial broadcast network devices, distributed pre-recorded network devices, VCR tape devices, DVD devices, phone machines, bank machines, security access systems, etc.

Satellite receiver 101 includes smart card portion 106, controller portion 107, and in certain embodiments of the present invention, detector 130. Smart card portion 106 includes the smart card 108 (when inserted), a smart card port 112, a smart card collar 113, and a smart card reader 110. In this disclosure, the terms "smart card" and "electronic security device" are used alternatively. The smart card reader 110 includes smart card reader head 111. The smart card 108 includes a smart card contact patch 109. The smart card port 112 permits insertion of, and removal of, different selected electronic security devices through the smart card port 112. Smart card collar 113 retains the smart card 108 in position when an electronic security device is inserted through the smart card port 112. The smart card port 112 is formed in a housing 121 that defines the outer surface of the satellite receiver 101.

The controller portion 107 includes central processor unit (CPU) 114, memory 116, input/output (I/O) 118, and bus 119. The integration and operation thereof are all well known and thus are not described herein.

Figure 2:
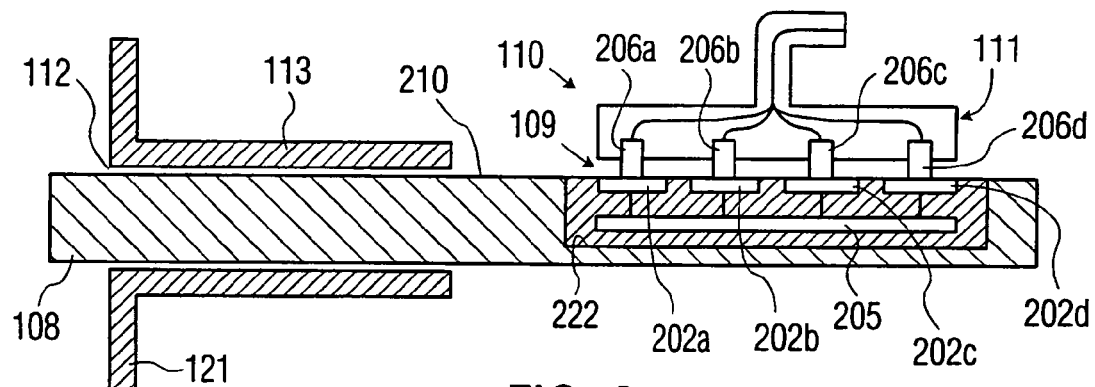
FIG. 2 shows a cross sectional expanded view of a smart card inserted into a host device of one embodiment of the present invention.

Electronic security device 108 inserted in smart card port 112 is further detailed in expanded partial cross sectional view in FIG. 2. Smart card contact patch 109, formed on an external surface of smart card 108, includes electrical contacts 202a, 202b, 202c, and 202d, integrated circuit 205, and insulative material, e.g. resin (not shown). Each electrical contact is electrically connected by conductors to integrated circuit 205. The surface of each electrical contact 202 is exposed to an external surface 210 of smart card 108 at smart card contact patch 109 such that an electric probe touching the exposed surface at each electrical contact 202 can transmit signals to, and receive signals from, the integrated circuit 205. The physical size of the smart card contact patch 109 helps to limit the amount of emitted electromagnetic radiation. An important function of integrated circuit 205, e.g. chip, is to store information (some of which may be modified). The circuit 205 may be in the form of an application specific integrated circuit. The information that is to be saved may include monetary amounts, programming capabilities, service entitlements, purchasing history, PIN codes, individual and address information, and other such information.

The smart card reader 110 is also depicted in FIG. 2 in a position that it would be when interacting with the electrical contacts 202. The smart card reader 110 includes a plurality of reader head contacts 206a, 206b, 206c, and 206d which electrically connect to electrical contacts 202a, 202b, 202c, and 202d, respectively, when the smart card is inserted in the smart card port 112. Although four electrical contacts and four reader head contacts are depicted in FIG. 2, any number of contacts can be selected such as, e.g., eight depicted in FIG. 3 as described in ISO7816. However, the number of electrical contacts must be suitable for the intended task of the smart card.

During use, typically a single electromagnetic security device remains with a host device in certain applications; while in different electromagnetic security device applications, different electronic security devices may be removed from, and inserted into, satellite receiver 101. In a household, for example, different members may have different television channels that their smart cards can access, or certain users may be allowed only a certain amount of use of the satellite receiver 101 (and the associated television 104) each week. While a smart card is described in this specification and depicted in the associated drawings, it is envisioned that any card, chip, or electronic security device from which the information can be accessed is within the scope of the present invention.

Both PCMIA and ISO7816 protocols are included in the National Renewable Security Standard (NRSS) interface. It is envisioned that the present invention may be applied to PCMIA-based systems as well. This is necessary since smart cards continue to evolve. Any card or other device that contains an integrated circuit and provides similar interactive capabilities to a host device as described herein is intended to be within the scope of the present invention.

A security problem with smart cards 108 results when any unauthorized smart card user attempts to access either the host device or information contained in the smart card. The fact that the smart card contact patch 109 is physically located within the satellite receiver 101 as shown in FIG. 1 is a first attempt to limit unauthorized users from gaining access to the information flow between the smart card 108 and the host device 101. Unauthorized users also attempt to gain access to information contained within the smart card 108 by electrically connecting a single distinct, appropriately sized, electrically conductive wire to each electrical contact 202a, 202b, 202c, and 202d. Thus, when the smart card 108 is inserted into the smart card port causing each electrical contact 202 to contact the respective reader head contact 206, then any signal transmitted between the smart card reader head 111 and the smart card 108 could be read at the other end of the wire, which would extend out of the smart card port 112. This unauthorized accessing or altering of information contained in the electronic security device (e.g. smart card), or unauthorized accessing or altering of information transferred between the host device and the electronic security device, is referred to herein as modification of the electronic security device.

An effect of electronic security device modification using hot-wiring involves radiative transmission of electromagnetic radiation from the wire used to hot-wire the smart card when electric current passes through the wire. In this case, the wire used to hot-wire the smart card functions as an antenna radiating electromagnetic radiation as a result of current passing through the wire. The electromagnetic radiation generated by any wire is similar in waveform (shape) to the scaled current passing through the wire. Thus, an unauthorized user who modifies the electronic security device could be detected when a pattern of emitted current having a similar pattern and frequency to the original signal is detected. Any periodic signal (and certain non-periodic signals such as a pulse signal) transmitted from the host device to the smart card 108 (or vice versa) could be used for this function, including the clock signal generated by the CPU 114 and transmitted to the electronic security device.

Radiation Detecting

Figure 3:
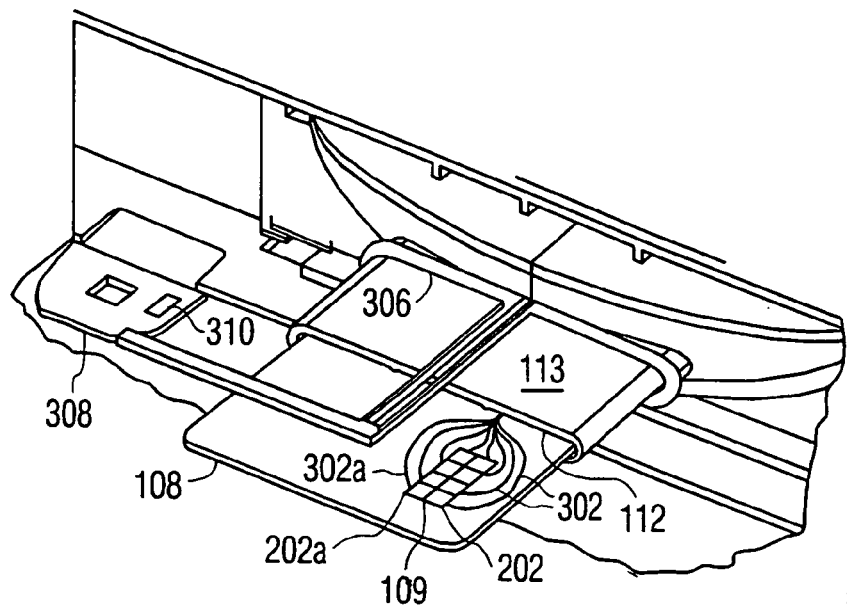
FIG. 3 shows a perspective view of the inside of the host device of FIG. 2.

An embodiment of the present invention is depicted in FIG. 3, which shows a perspective view of the inside of the satellite receiver 101 depicted in, and described relative to, FIG. 1. FIG. 3 shows the smart card (electronic security device) 108 inserted into the smart card port 112 defined within the smart card collar 113 or housing 121. For ease of display, the smart card reader 110 is not shown from FIG. 3. The smart card contact patch 109 is disposed well within, and remote from, the smart card port 112 formed by smart card collar 113 such that any wires used to hot-wire the smart card would necessarily pass through smart card port 112. In FIG. 3, a distinct hot-wired wire 302 is connected to each distinct electrical contact 202. Though only four electrical contacts 202a–d are depicted in FIG. 2, there are eight smart wire contacts shown in FIG. 3. To transfer information outside of the host device 101, each hot-wired wire 302 extends from its respective electrical contact 202 and passes through the smart card port 112.

Based upon Maxwell's equations, any electrical signal passing through any of the hot-wired wires 302 in a modified electronic security device will generate electromagnetic radiation consisting of both an electrostatic field and a magnetic field. This electromagnetic radiation can be superimposed upon a similar type of electromagnetic radiation generated by other sources (e.g., other hot-wired wires 302 and well as electromagnetic radiation sources located outside of the satellite receiver 101). In the FIG. 3 embodiment, a loop antenna 306 encircles smart card collar 113. The magnetic radiation (included within the electromagnetic radiation) being applied to loop antenna 306 generates an electric current in loop antenna 306. A detector 308 (which is one form of detector 130) can sense the electric current in loop antenna.

The loop antenna 306 represents one configuration capable of detecting a magnetic field generated by wire 302 extending through smart card port 112. Unfortunately, the magnetic field generated by the wire 302 passing out of the smart card port 112 will cross-polarize the electricity in loop antenna 306 if the loop antenna is perpendicular to the wire 302. This cross-polarization limits the current produced in the antenna and therefore the ability of detector 308 to detect the presence of wire 302 in certain cases. The cross-polarization, however, is reduced when the wire 302 is physically angled from perpendicular relative to the plane of the loop antenna 306. This "angling" of the wire results in a greater detectability of wire 302 by detector 308. A configuration of antenna 306 that provides a more uniform detectability of wire 302, regardless of the physical angle of the wire relative to antenna 306, is to provide a ferrite torioid with the antenna wires wound around the toroid. This "coiled toroid" is within the intended scope of the term "loop antenna" as used within the present invention.

Figure 4A:
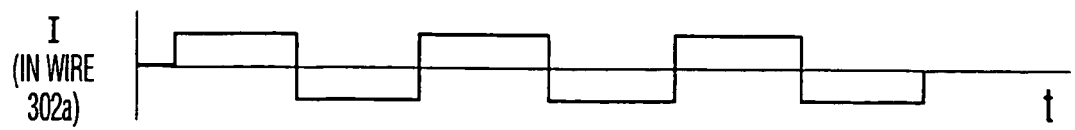
FIG. 4a shows an example of an electric current signal generated in hot-wired wire 302a of FIG. 3.

FIG. 4, including FIGS. 4a to 4e, depicts an example of a series of signals that are generated when an electric current is generated in hot-wired wire 302 of FIG. 3. FIG. 4a depicts a plot of electric current versus time of a signature signal generated in hot-wired wire 302a. This signature signal is preferably a characteristic periodic waveform that may be generated by applying a clock signal generated from CPU 114 to integrated circuit 205. The signature signal may be applied from either the host device 101 to the smart card 108 or from the smart card to the host device. The signature signal may be applied across one, or more than one, electrical contact 202a–d (when the signature signal is transmitted between the host device 101 and the smart card 108). Though FIG. 4 depicts a rectangular clock signature signal, any periodic signature signal (and even certain aperiodic signature signals such as a pulse signal) can be used in this embodiment.

Figure 4B:
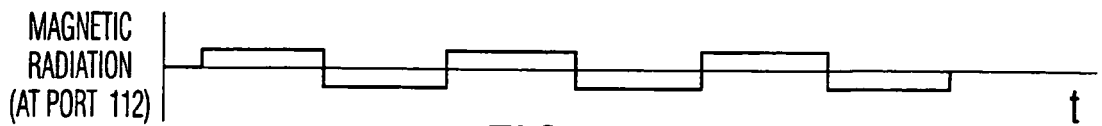
FIG. 4b shows an example of magnetic radiation generated in the vicinity of magnetic loop antenna 306 as a result of the FIG. 4a signal.
Figure 4C:
FIG. 4c shows an example of magnetic radiation generated in the vicinity of magnetic loop antenna 306 by all other sources from the FIG. 4a signal.
Figure 4D:
FIG. 4d shows the FIG. 4b magnetic radiation superimposed upon the FIG. 4c magnetic radiation.
Figure 4E:
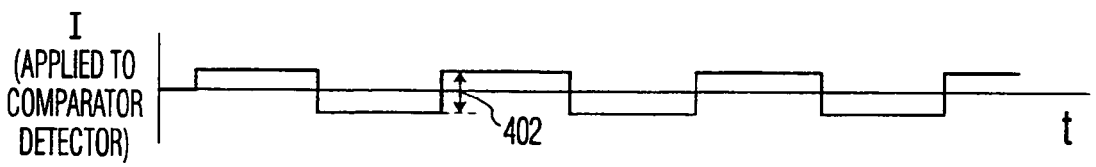
FIG. 4e shows an example of the detector high pass filtered electric current existing in the detector after the FIG. 4d magnetic radiation is applied to the loop antenna 306 of FIG. 3.

FIG. 4b depicts an example of the magnetic radiation that may be generated in the vicinity of loop antenna 306 as a result of the electric current corresponding to the signature signal passing through hot-wired wire 302. The units of electric current and magnetic radiation are arbitrary, and depend upon the physical dimensions, materials, etc. of the loop antenna, current strength, length of the hot-wired wire 302a, etc. FIG. 4c shows a sample of additional magnetic radiation located in the vicinity of loop antenna 306. FIG. 4d depicts the FIG. 4b magnetic radiation resulting from the signature signal superimposed on the FIG. 4c magnetic radiation. The FIG. 4d electric current will be generated in the loop antenna 306. FIG. 4e represents the FIG. 4d waveform after passing through a high pass or band pass filter selected to allow the frequency associated with the current in FIG. 4a to pass through. The FIG. 4e signal is applied to detector 308. If the characteristics (including amplitude 402, frequency, and waveform) of the FIG. 4e signal is very similar to the signature signal, a comparator circuit 310, located in the detector 308, determines that the smart card contact patch 109 has been tampered with. The detector 308, based upon the input from the comparator circuit 310 thereupon makes available a signal to the CPU 114 indicating that the CPU should terminate communications with the smart card or notify the system operator. Comparator circuits are well known in the art and will not be further detailed herein.

Figure 5:
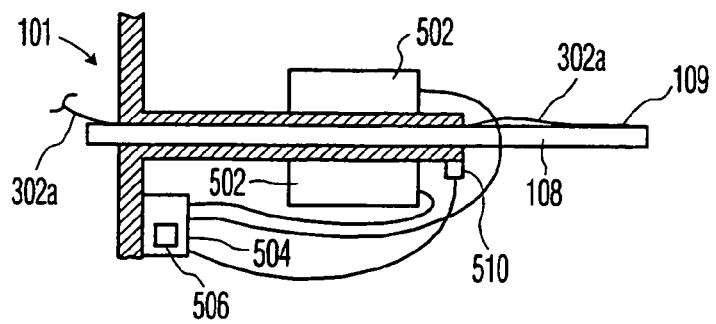
FIG. 5 shows a cross sectional view of the inside of the satellite receiver in accordance with one embodiment of the present invention.

FIG. 5 shows an alternate embodiment capable of sensing the existence of a hot-wired wire 302a (only one hot-wired wire is shown in FIG. 5 which is shown inside of the satellite receiver 101 in FIG. 1, and also passing out of the smart card port 112 in FIG. 5) in a modified electronic security device. The difference between the FIG. 3 and FIG. 5 embodiments is that the FIG. 3 embodiment measures magnetic radiation using loop antenna 306 as described above. By comparison, the FIG. 5 embodiment measures electrostatic radiation, generated by the electric current passing through the hot-wired wire 302a, using capacitance measurement element 502. Capacitance measurement element 502 typically operates in pairs with one located above the smart card port 112 in FIG. 5 and another one below. The capacitive measurement element is configured, in the FIG. 5 embodiment, as two substantially parallel film plates. The capacitance between the measurement devices is transmitted to capacitance detector 504. The waveforms shown in FIGS. 4a to 4e also apply to the FIG. 5 embodiment with the following changes to FIG. 4. In FIGS. 4b, 4c, and 4d, the magnetic radiation is changed to electrostatic radiation since this is the type of radiation that is sensed by capacitance measurement devices 502. Additionally, in FIG. 4e, current I represents the current applied to a comparator 506 located in the capacitance detector 504. Once again, if the current applied to comparator 506 exceeds a prescribed threshold in the FIG. 5 embodiment, then the capacitive detector 504 signals to CPU 114 in controller portion 107 to cease interaction or alert a system operator since the device is modified. The addition of metal from, e.g., hot-wired wires 302, would alter this capacitance in a manner by detectable by the capacitive detector 504.

The distance between the capacitive measurement elements 502 is preferably small. Using a distance of 0.125 inches, and a cross sectional area of the electronic measurement element 502 of 1 inch-squared, provides for simplified calculations. It is assumed that smart card 108 fills the entire space between the capacitive measurement elements 502. If the entire thickness of the slot between the capacitive measurement elements 502 is not filled by the smart card, the capacitive values have to be modified accordingly.

Electronic Security Device Capacitive Sensing

In an alternate embodiment of the present invention, as also depicted in FIG. 5, a dielectric sensor 510 is positioned adjacent the electronic security device 108 when inserted in the smart card port 112. The dielectric sensor 510 senses the dielectric constants of the electronic security device and compares it to a known value for an, e.g., smart card. If the measured dielectric value is outside a predetermined range, detector 504 can assert that the card being used is a fake (such as a paddleboard, described in the background). Under these circumstances, circuits associated with the detector (not shown) can either halt operation of the host device 101, or warn authorities that a fake card is being used.

Plastic dielectric constants, most smart cards are formed from plastic, range from 2.1 for teflon to 2.98 for polycarbonate, providing a range of 4.4 to 5.3 pico farads (pf) based upon the equation:

Capacitance=B×area/dist

B=dielectric constant of the material
Area=the surface area of each plate
Dist=the distance between the plates Most printed circuit boards have a dielectric constant of approximately 4, resulting in a capacitance of 7.19 pf. This difference in measured capacitance between a smart card and a printed circuit board can be used to detect if a printed circuit board is being inserted in the smart card port 112 in place of a smart card.

Two techniques to sense radiation resulting from hot-wiring an electronic security device have been described above (the electromagnetic radiation sensed in FIG. 3 and the capacitive measurement measured in FIG. 5), as well as one technique to sense a dielectric constant of the sensed by the dielectric sensor 510 depicted in FIG. 5. Each of these techniques are efforts to counter modification of the electronic security device 108. Though each of these techniques are described separately, it is envisioned that these techniques may be used in any combination. If any of the techniques indicate modification of the electronic security device, then it should be assumed that the electronic security device has been modified.

Controller Logic

Figure 6:
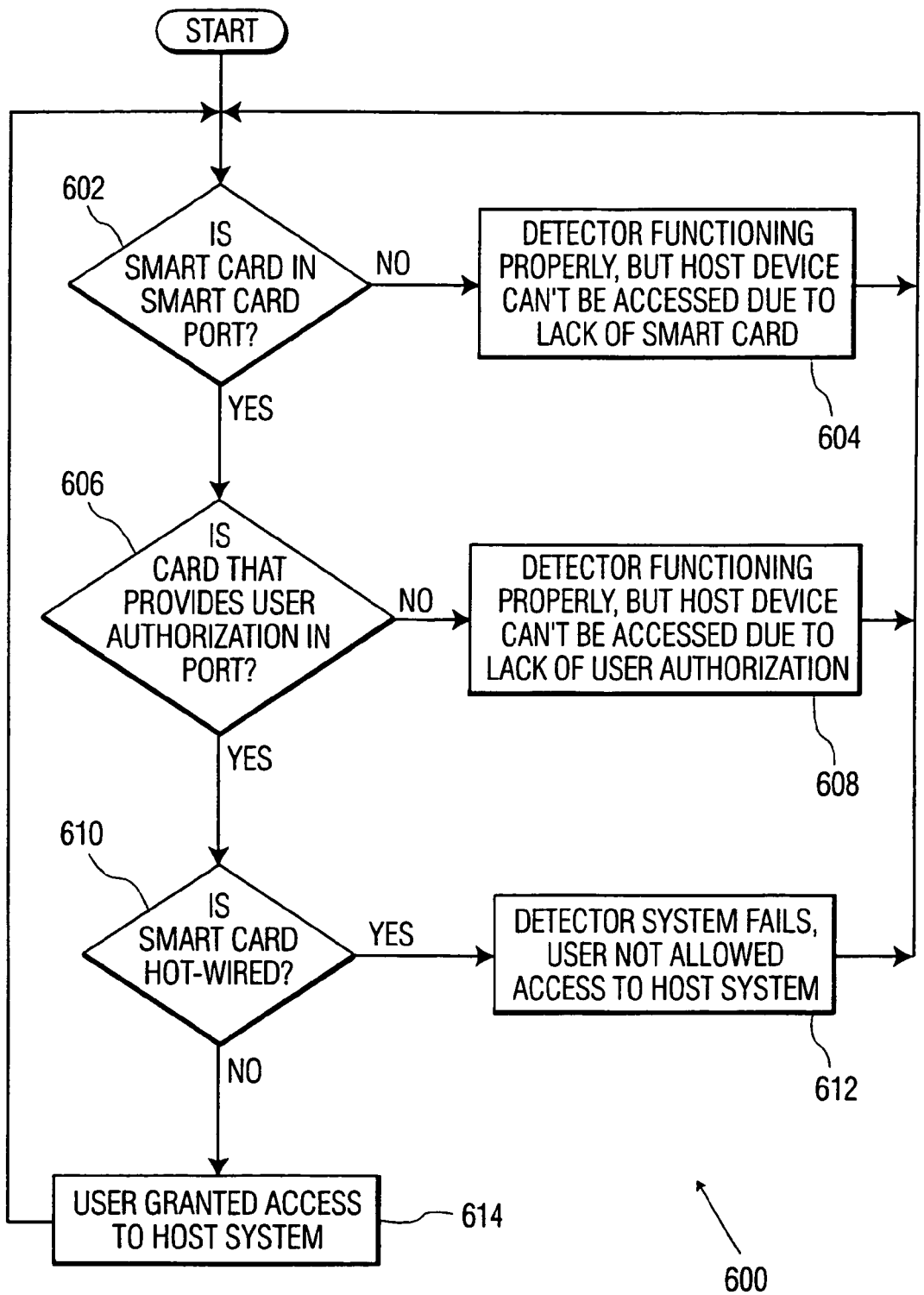
FIG. 6 shows a flow chart of the method of determining presence and/or suitability of the smart card.

There are three different options, relating to smart card 108, that controller portion 107 may encounter during normal operations. These options are depicted in the FIG. 6 method 600. The first access control option encountered in decision block 602 is whether smart card is located in smart card port 112. If the answer to decision block 602 is NO, then the method continues to block 604 in which controller portion 107 indicates that the detector 308 is functioning properly, but that the host device (e.g., satellite receiver 101) cannot be accessed due to lack of authorization as a result of a lack of a smart card 108. If the answer to decision block 602 is YES, then the method continues to decision block 606 in which controller portion 101 determines that although a card is present in the smart card port 112, the card is not appropriate to provide authorization to the user. If the answer to decision block 606 is NO, the controller portion 107 indicates that the detector is functioning properly, but that the satellite receiver 101 may not be accessed due to lack of authorization caused by improper smart card in block 608 (or alternatively the host device provider may be notified that an improper smart card is being used). If the answer to decision block 606 is YES, then the controller continues to decision block 610 representing the third option control option. In decision block 610 that represents the second access control option, detector (for example, 308 in FIG. 3 or 504 in FIG. 5) indicates that the electronic security device in satellite receiver is modified via smart card port 112 as described above relative to the three modification techniques depicted in FIGS. 3 and 5. If the answer to decision block 610 is YES, then controller portion 107 determines that the detector system fails due to a modified electronic security device, and the user is not permitted to access the system (or alternatively the host device provider is informed that a modified electronic security device is being used).

Detection of a modified electrical security device in the host device 101 may be based upon the capacitive measurement as described relative to FIG. 5, the inductive measurement as described relative to FIG. 3, the capacitive sensing described relative to FIG. 5, or any other well known type of suitable detector measurement would be within the scope of the present invention. In the blocks 604, 608, and 612, the user is not granted access to the host device, and the method 600 continues looping to decision block 602. If the answer to decision block 610 is NO, then controller portion determines that an effective smart card is present and the detector does not indicate that the smart card is being modified. Under these circumstances, controller portion 107 indicates that the detector passes and permits operation of the host device (e.g., desired channel reception of satellite receiver 101). After a predetermined delay in block 614, the controller portion 107, in block 614, may loop to decision 602 to continually ensure that the electronic security device is not being modified.

Though various embodiments which incorporate teachings of the present invention have been shown and described in detail herein, those skilled in the art can readily devise many other varied embodiments that incorporate the teachings.

What is claimed is:

1. An apparatus sensing unauthorized use of an electronic security device, the apparatus comprising a host device with a housing having an opening forming a port configured to receive the electronic security device, the port forming a limited passage into the housing for passage of the electronic security device; and a port detector for sensing radiation emitted from unauthorized modification of the electronic security device, the port detector controlling or preventing operation of the apparatus based upon detection of said unauthorized modification, wherein the unauthorized modification includes coupling to the electronic security device conductors extending through the port and wherein the port detector has a loop antenna encompassing the opening forming the port, the loop antenna being responsive to time varying currents passing along the conductors.

2. The apparatus set forth in claim 1, wherein the port detector detects electromagnetic radiation occurring at the port having a prescribed frequency.

3. The apparatus set forth in claim 1, wherein the apparatus is operable to apply a time varying signal to the electronic security device, which time varying signal is detected by the port detector at the loop antenna as a signature signal and wherein the port detector is responsive to variations in capacitance that are identifiable from the signature signal and indicate presence of said conductor.

4. The apparatus set forth in claim 1, wherein the electronic security device emits a time varying signal detected by the port detector as a signature signal at the loop antenna, and wherein the port detector is responsive to variations in a capacitance of the electronic security device that are identifiable from the signature signal.

5. The apparatus set forth in claim 1, wherein the electronic security device is a smart card.

6. A method of determining unauthorized use of an electronic security device wherein the electronic security device is used in an apparatus having a housing that is substantially closed but for an opening defining a port for receiving the electronic security device and the unauthorized use includes coupling conductors to the electronic security device, the conductors extending along a path through the port wherein:

a loop antenna is placed at the opening defining the port, encompassing the path of any said conductors; and, radiation received at the loop antenna is monitored to detect unauthorized use of the electronic security device by providing a time varying current in the conductors and detecting a resulting signature at the loop antenna, and determining that the electronic security device has a capacitance detected by a signature signal at the loop antenna indicating presence of the conductors.

7. The method set forth in claim 6, further comprising at least limiting transfer of information between the electronic security device and the host device upon detection of said unauthorized use.

8. The method set forth in claim 6, wherein the electronic security device is a smart card.

* * * * *